United States Patent [19]

Farmer, Jr. et al.

[11] 4,108,792

[45] Aug. 22, 1978

[54] CALCIUM HYPOCHLORITE COMPOSITION CONTAINING MAGNESIUM AND PROCESS FOR MAKING SAME

[75] Inventors: Douglas A. Farmer, Jr., West Haven; John A. Wojtowicz, Cheshire, both of Conn.

[73] Assignee: Olin Corporation, New Haven, Conn.

[21] Appl. No.: 781,372

[22] Filed: Mar. 25, 1977

[51] Int. Cl.$^2$ .................... C01B 11/06; C11D 3/395; D06L 3/08
[52] U.S. Cl. ................. 252/187 H; 8/108 A; 252/95; 252/99; 423/474; 424/149
[58] Field of Search ........ 252/187 H, 95, 99; 8/108 R, 108 A; 423/474; 424/149

[56] References Cited

U.S. PATENT DOCUMENTS

| 3,793,216 | 2/1974 | Dychdala et al. ............... 252/187 H |
| 3,843,548 | 10/1974 | Jamps ............... 252/187 H |
| 3,872,219 | 3/1975 | Sakowski ............... 423/474 |
| 3,895,099 | 7/1975 | Sakowski ............... 423/474 |
| 3,953,354 | 4/1976 | Faust ............... 252/187 H |
| 3,954,948 | 5/1976 | Sakowski ............... 423/474 |

*Primary Examiner*—Benjamin R. Padgett
*Assistant Examiner*—Irwin Gluck
*Attorney, Agent, or Firm*—William A. Simons; Thomas P. O'Day

[57] ABSTRACT

The present invention describes a solid calcium hypochlorite composition comprising calcium hypochlorite and about 0.5% to about 50% by weight of substantially water-insoluble and unchlorinated magnesium compounds, said magnesium compounds being derived from impure hydrated lime. Furthermore, the present invention describes a process for making this composition, which is an improvement in the known process for the manufacture of a solid calcium hypochlorite composition wherein an aqueous slurry comprising a hydrated lime, a mixture of hydrated lime and at least one alkali metal hydroxide, or a mixture of hydrated lime and at least one alkali metal hypochlorite, is chlorinated to form an aqueous chlorinated slurry containing calcium hypochlorite and further processing said chlorinated slurry to recover a solid calcium hypochlorite composition.

10 Claims, No Drawings

CALCIUM HYPOCHLORITE COMPOSITION CONTAINING MAGNESIUM AND PROCESS FOR MAKING SAME

BACKGROUND OF THE INVENTION

A. Field of the Invention

This invention relates to a process for making solid calcium hypochlorite compositions from impure hydrated limes having relatively high amounts of magnesium contained therein. This invention also relates to making a solid calcium hypochlorite composition containing substantially water-insoluble and unchlorinated magnesium compounds which are derived from impure hydrated limes.

B. Description of the Prior Art

Solid calcium hypochlorite compositions are widely used today for water treatment, especially of swimming pools where it serves as a convenient source of chlorine for disinfectant purposes, and as a commercial bleaching and sanitizing agent. Chemically, these commercial compositions usually contain a major portion of $Ca(OCl)_2$ with the remainder being a mixture with varying amounts of sodium chloride, calcium chloride, calcium hydroxide, calcium carbonate, calcium chlorate and other chemicals, and having a water content that may range from less than about 1% by weight up to about 15% by weight. However, such products are always nominally referred to in the industry as solid calcium hypochlorite compositions. As particular examples, see U.S. Pat. Nos. 2,963,440, issued to Robson on Dec. 6, 1970; 3,036,013, issued to Jaszka et al on May 22, 1962; 3,544,267, issued to Dychdala on Dec. 1, 1970; 3,560,396, issued to Robson on Feb. 2, 1971; 3,669,894, issued to Faust on June 13, 1972; and 3,793,216, issued to Dychdala et al on Feb. 19, 1974.

A great number of processes are known in the art for manufacturing these solid calcium hypochlorite compositions. U.S. Pat. No. 3,134,641, issued to Robert D. Gleichert on May 26, 1964, discloses the method of reacting hypochlorous acid (HOCl) with slaked or hydrated lime at a pH of about 9.5 followed by drying the reaction medium to form the product. U.S. Pat. No. 3,241,912, issued to Nicolaisen on Mar. 22, 1966, discloses the chlorination of a mixture of calcium hydroxide and sodium hydroxide in a specific column apparatus to form calcium hypochlorite product. U.S. Pat. No. 3,544,267, issued to Dychdala on Dec. 1, 1970, teaches a method wherein a mixture of hydrated lime and caustic are chlorinated at low temperatures, i.e., 12° C, to form a slurry containing triple salt — $Ca(OCl)_2.NaOCl.NaCl.12H_2O$ —, this triple salt is separated from the solution and added to a chlorinated lime slurry to convert the NaOCl contained in the triple salt to $Ca(OCl)_2$, and the resulting product mixture is dried to form a desirable stable calcium hypochlorite composition. U.S. Pat. No. 3,895,099, issued to Sakowski on July 15, 1975, teaches still another technique. In this method, an aqueous solution of caustic is chlorinated to form a sodium hypochlorite solution containing solid sodium chloride, the solid sodium chloride is then removed and hydrated lime is mixed with the sodium hypochlorite solution. This aqueous slurry of hydrated lime and sodium hypochlorite is chlorinated and the resulting product mixture is dried to form a stable, solid calcium hypochlorite composition.

Numerous variations and modifications of each of these processes have been practiced, but normally in almost every case, an aqueous slurry containing hydrated lime; a mixture of hydrated lime and caustic; or a mixture of hydrated lime and sodium hypochlorite is chorinated and this resulting reaction product is further processed, normally including a subsequent drying step, to form a solid calcium hypochlorite composition.

In the past, the calcium hypochlorite industry has generally always been able to utilize relatively pure hydrated lime, i.e., high in $Ca(OH)_2$ with minor, but tolerable levels of impurities, to make their composition products. In those cases where relatively impure hydrated limes were employed, the lime impurities were removed during processing, often preliminarily to the actual making of the calcium hypochlorite solution. Note that U.S. Pat. No. 3,895,099 teaches to remove these impurities in the very first step. These lime impurities may include insoluble impurities such as silica, aluminum salts, iron salts, magnesium salts, magnesium oxide, magnesium hydroxide, unburned limestone (calcium carbonate and magensium carbonate) and other compounds in trace quantities. However, like many industrial raw materials today, supplies of relatively pure hydrated lime are diminishing. Therefore, in the future, manufacturers may have to employ hydrated limes that contain more impurities. With the use of these relatively more impure hydrated limes, new problems associated with the impurities which in the past were or could have been overlooked because of the minor amounts then involved, now must be recognized and solved.

In particular, many impure hydrated limes contain relatively large amounts of magnesium in the form of magnesium salts, magnesium oxide and/or magnesium hydroxide, especially the latter two compounds. However, magnesium has been well known in the art to be associated with instability problems of calcium hypochlorite composition products and, therefore, hydrated limes containing relatively large amounts of magnesium were in the past not desired by the calcium hypochlorite industry. In particular, it was found that the chlorination of magnesium-containing compounds especially MgO and $Mg(OH)_2$ will result in the formation of magnesium hypochlorite $Mg(OCl)_2$. This latter compound will decompose readily and is very unstable under many conditions, especially in the absence of water. Therefore, during the subsequent drying step, or steps, for making calcium hypochlorite compositions, $Mg(OCl)_2$ has a good chance to decompose. This decomposition gives off a large exothermic heat of reaction which may cause fires in the dryers. Further, this heat of decomposition may also cause the calcium hypochlorite admixed therewith to decompose and, thereby, cause the final product to have lower amounts of $Ca(OCl)_2$.

On the other hand, a good supply of high magnesium-containing hydrated lime exists and could represent a new source for the manufacture of solid calcium hypochlorite compositions. Therefore, it would greatly benefit the industry if a new process could be developed or present processes improved whereby hydrated limes having relatively high levels of magnesium present therein could be utilized.

BRIEF SUMMARY OF THE INVENTION

In response to this need, the present invention is directed to a process improvement by which the conventional processes for making solid calcium hypochlorite compositions can utilize relatively high magnesium-containing hydrated limes. Specifically, this invention is an improvement in the processes for the manufacture of a solid calcium hypochlorite composition wherein an aqueous slurry comprising a hydrated lime is chlorinated to form an aqueous chlorinated slurry containing calcium hypochlorite and then this chlorinated slurry is further processed to recover a solid calcium hypochlorite composition, the present improvement comprising:

(a) employing a hydrated lime having about 97% to about 50% by weight calcium hydroxide and more than about 0.5% by weight magnesium based on the total dry weight of said hydrated lime, (b) terminating said chlorination reaction when from 75% to about 99.5% by weight of said calcium hydroxide is chlorinated and 0% to about 5% by weight of said magnesium is chlorinated to form a slurry of substantially water-insoluble and unchlorinated magnesium compounds in an aqueous solution of calcium hypochlorite, and (c) further processing said slurry to recover a solid calcium hypochlorite composition having admixed therein with said substantially water-insoluble and unchlorinated magnesium compounds.

DETAILED DESCRIPTION

The process of the present invention improves prior art processes for making calcium hypochlorite compositions by the combination of three critical parameters. The first of these parameters is to employ as a reactant a high magnesium-containing hydrated lime having about 97% to about 50% by weight calcium hydroxide and more than about 0.5% by weight magnesium contained therein as a starting material. These percentages are all based on total dry weight of said hydrated lime. A major portion of the magnesium is in the form of magnesium oxide and magnesium hydroxide, with the rest being normally less than 10% by weight of the Mg in the form of magnesium salts. However, the percentage of magnesium in the hydrated lime as used in the present specification and claims is on an elemental weight basis and does not include the weight of the anions combined with the magnesium. Further, the term "high magnesium-containing hydrated limes" may include relatively highly pure limes that contain above 90% by weight, preferably about 95% by weight, Ca(OH)$_2$ on a total dry basis, that also contain more than 0.5% magnesium. Also, the term, on the other end of the spectrum, may include dolomitic limes which have only about 50% to about 80% by weight Ca(OH)$_2$, but contain from about 10% to about 25% by weight magnesium. Moreover, the term includes the use of hydrated limes having other impurities beside magnesium that are normally present. Preferably, high magnesium-containing hydrated limes contain from 1% to about 30% by weight magnesium. More preferably, the amounts of impurities other than magnesium in the limes are all very low and within the tolerable levels generally employed by industry in the past.

The high magnesium-containing hydrated lime can be utilized in any conventional process for making hypochlorite compositions. Examples of such processes are disclosed in the above-mentioned U.S. Patents or any of the numerous variations thereof. As stated above, there are generally three different methods whereby a calcium hypochlorite composition product is produced. These are:

(1) straight lime chlorination wherein the hydrated lime is chlorinated by itself;

(2) chlorination of a mixture of hydrated lime and at least one alkali metal hydroxide such as caustic (sodium hydroxide) or potassium hydroxide; and (3) chlorination of a mixture of hydrated lime and at least one alkali metal hypochlorite such as sodium hypochlorite.

These latter two methods normally encompass the well-known "triple salt" process whereby the calcium hypochlorite composition is not made directly, but instead is made subsequent to the formation of a triple salt — Ca(OCl)$_2$.Na(OCl).NaCl.12H$_2$O. Of course, in either three chlorination steps the hydrated limes may be mixed with other chemicals (e.g., NaCl or iron compounds). See U.S. Pat. Nos. 3,793,216, issued to Dychdala on Feb. 19, 1974 and 3,872,219, issued to Sakowski on Mar. 18, 1975.

Generally, the high magnesium-containing hydrated lime of the present invention or mixtures containing said lime are chlorinated while in the form of an aqueous slurry. Preparation of such lime slurries are accomplished by simply adding water to bulk hydrated lime or a chemical mixture containing such. Any conventional means for preparing this slurry can be utilized. Likewise, the ratio of water to hydrated lime is not critical to the present invention and amounts of water which are normally commercially desirable can be employed.

Chlorination agents may be any conventional agents normally used in making calcium hypochlorite compositions. These may include liquid Cl$_2$, gaseous Cl$_2$, HOCl, or mixtures thereof. The preferred chlorination agent as widely used in the industry today is liquid Cl$_2$.

According to conventional methods, when an aqueous slurry of straight hydrated lime, i.e., only hydrated lime, is chlorinated, the following equation may be involved:

$$2Ca(OH)_2 + 2Cl_2 \rightarrow Ca(OCl)_2.2H_2O + CaCl_2 \qquad (I)$$

Commercially, this straight hydrated lime chlorination is utilized to form a chlorinated slurry (CaCl$_2$ + Ca(OCl)$_2$) which is added to the triple salt discussed below, whereby the NaOCl of the triple salt is converted into Ca(OCl)$_2$ and NaCl.

Also according to conventional methods, when an aqueous slurry comprising a mixture of hydrated lime and at least one alkali metal hydroxide such as sodium hydroxide or caustic is chlorinated, the following equations may occur:

$$2NaOH + Cl_2 \longrightarrow NaOCl + NaCl + H_2O \qquad (II)$$

$$2Ca(OH)_2 + 2Cl_2 \longrightarrow CaCl_2 + Ca(OCl)_2 + 2H_2O \qquad (III)$$

$$Ca(OCl)_2 + NaOCl + NaCl + 12H_2O \xrightarrow{12°\,C} Ca(OCl)_2.NaOCl.NaCl.12H_2O \qquad (IV)$$
$$\text{(triple salt)}$$

This type of chlorination is well known in the calcium hypochlorite industry as the triple salt preparation and represents a leading method by which calcium hypochlorite compositions are made today. This triple salt is formed by chlorinating at temperatures below about 30° C and it will not easily decompose into undesirable by-products.

Further, in the conventional manufacture of calcium hypochlorite compositions, it has also been desirable to first chlorinate an aqueous slurry of an alkali metal hydroxide, such as sodium hydroxide, to produce a solution of alkali metal hypochlorite containing solid alkali metal chloride. Then, the solid alkali metal chloride is separated out by filtration or other conventional liquid-solid separation means and an aqueous solution of an alkali metal hypochlorite containing a small amount of alkali metal chloride remains. This can be represented by equation (II) shown above. This preliminary chlorination and separation step is desirable because it facilitates the removal of relatively large amounts of alkali metal chlorides, such as sodium chloride, from final calcium hypochlorite composition product. Therefore, the final composition can contain a higher percentage of the active $Ca(OCl)_2$ component. After the separation of the solid alkali metal chloride, the aqueous solution of the alkali metal hypochlorite is added to a hydrated lime, either in dry form or also in an aqueous slurry. This mixture is then chlorinated to form an aqueous solution containing either calcium hypochlorite or the above triple salt. The chlorination can be represented by the equations as follows:

$$2Ca(OH)_2 + 2Cl_2 \longrightarrow Ca(OCl)_2 \cdot 2H_2O + CaCl_2 \quad (V)$$

$$2NaOCl + CaCl_2 \longrightarrow Ca(OCl)_2 + 2NaCl \quad (VI)$$

$$Ca(OCl)_2 + NaOCl + NaCl + 12H_2O \xrightarrow{12^\circ C} \quad (VII)$$
$$Ca(OCl)_2 \cdot NaOCl \cdot NaCl \cdot 12H_2O$$
(triple salt)

When the triple salt is produced according to either of the latter two methods or variations thereof, it can be decomposed and a new calcium hypochlorite slurry can be produced by adding to it a chlorinated lime slurry, such as is shown in the following equation:

$$2Ca(OCl)_2 \cdot NaOCl \cdot NaCl \cdot 12H_2O + \underbrace{CaCl_2 + Ca(OCl)_2}_{\text{chlorinated lime slurry}} \quad (VIII)$$

$$\longrightarrow 4Ca(OCl)_2 + 4NaCl + 24H_2O$$

Preferably, the triple salt is first separated from the liquid fraction or mother liquor before the chlorinated lime slurry is combined with it. The amount of the chlorinated lime slurry added to the triple salt should be sufficient to form $Ca(OCl)_2$ and NaCl from the NaOCl in the triple salt and the calcium chloride present in the chlorinated slurry. The product of the reaction shown by equation (VIII) is a paste containing primarily calcium hypochlorite and sodium chloride. The paste is dried to obtain a finished product containing relatively non-hydroscopic sodium chloride.

In the process of the present invention, the magnesium compounds contained within the hydrated lime, i.e., especially magnesium oxide and magnesium hydroxide, would normally be converted into undesirable chlorinated compounds, $Mg(OCl)_2$ and $MgCl_2$, according to equations similar to those shown above for the corresponding calcium compounds. However, it has been discovered that under certain conditions, the chlorination reactions with $Mg(OH)_2$ and MgO can be controlled so that while the calcium hydroxide in the hydrated lime is substantially all chlorinated, (e.g., in Equations I, III or V) the magnesium hydroxide and magnesium oxide are substantially not reacted.

Therefore, in order to accomplish this desired prevention of $Mg(OCl)_2$ formation, the second critical parameter of the present process is to terminate the above-identified chlorination reactions when from about 75.0% to about 99.5% by weight of the calcium hydroxide in the hydrated lime has been chlorinated and from 0% to about 5% by weight of the magnesium in the hydrated lime is chlorinated. By terminating these chlorination reactions in this fashion, an aqueous chlorinated slurry containing calcium hypochlorite and substantially water-insoluble and substantially unchlorinated magnesium compounds is formed. It is highly desirable to convert as much as possible of the $Ca(OH)_2$ into the desired chlorinated product $Ca(OCl)_2$ and other chlorinated by-products such as $CaCl_2$. Also by doing this, it is realized that small amounts of $Ca(OH)_2$ will be left which would unfortunately act as a diluent to the active chlorine component. Therefore, it is advantageous to have at least about 90%, more preferably at least about 95% but not more than about 99.0% by weight of the $Ca(OH)_2$ in the hydrated lime chlorinated.

On the other hand, it is necessary to run the above chlorination reaction so that none or very little of the magnesium compounds contained in the hydrated lime is chlorinated. This action prevents the formation of substantial amounts of the unstable chlorinated magnesium compound $Mg(OCl)_2$ which may decompose during subsequent processing and thereby cause disadvantageous production problems such as fires and decomposition of the $Ca(OCl)_2$ component of the composition. Preferably, less than about 2.5% by weight of the magnesium contained in the hydrated lime should be chlorinated. As seen in the comparison embodiment below, it has been found that a chlorination of magnesium compounds in amounts even as low as about 10% may cause a lowering or decomposition of the $Ca(OCl)_2$ in the final composition.

The termination of the chlorination reaction is normally carried out by simply stopping the addition of the chlorinating agent into the reaction mixture or removing the resulting aqueous chlorinated slurry to the next step in the processing. The point of termination can be easily determined through means of analysis, pH control or other convenient means. A pH recorder-controller will assure proper control of the chlorination rate of feed to maintain the desired pH value. Also, periodic chemical analysis can be employed to determine whether adjustments in the flow of any of the reactants is required. If pH control is employed, the pH of the chlorination step should never be allowed to go below a pH of about 10.0, preferably not below 10.2. At pH's below 10.0, the chlorination reactions may proceed to chlorinate all of the $Ca(OH)_2$ and large amounts of $Mg(OH)_2$ and MgO which is undesirable for reasons stated below.

In the past, conventional chlorination procedures usually desired complete chlorination of the $Ca(OH)_2$ in the hydrated lime (i.e., more than 99.9% by weight conversion). However, according to the present invention, it has been found that when high magnesium-containing hydrated limes are being utilized, these chlorination procedures must be terminated sooner than they have been before. By doing so, substantially all of the magnesium compounds contained therein will not become chlorinated and the undesirable and unstable compound $Mg(OCl)_2$ will not be formed in substantial amounts. A slight amount of $Ca(OH)_2$ will be left unreacted; however, its presence may benefit the process because of its stabilizing effect on the $Mg(OCl)_2$ that may be formed as shown in Equation IX.

$$Mg(OCl)_2 + Ca(OH)_2 \rightarrow Mg(OH)_2 + Ca(OCl)_2 \quad (IX)$$

Since the chlorination steps are carried out in an aqueous slurry, any $Mg(OCl)_2$ still existing will not usually decompose immediately because of the stabilizing effect from the large amount of water and $Ca(OH)_2$ present. However, when much of this water is removed in subsequent drying step, the chances of $Mg(OCl)_2$ decomposition are much greater. Therefore, if and when substantial amounts of this compound decompose into magnesium chlorate and magnesium chloride (see Equation X below), large amounts of heat are released.

$$3Mg(OCl)_2 \rightarrow Mg(ClO_3)_2 + 2MgCl_2 + \text{Heat} \qquad (X)$$

In a drying operation, release of this heat can cause appreciable problems to the operation of the process and the equipment being employed. Specifically, this liberated heat could easily start fires which could damage the drying apparatus and stop the whole process operation. Furthermore, even if the decomposition of $Mg(OCl)_2$ did not cause these serious problems to occur, there is greater possibility that the liberated heat will cause the $Ca(OCl)_2$ with which the magnesium is admixed to also decompose, thereby lowering the amount of the active chlorine component in the composition product. This latter action can raise serious problems if the manufactured calcium hypochlorite must meet strict specifications as to minimum amount of calcium hypochlorite in the composition. Decomposition of the $Ca(OCl)_2$ can occur in the following ways as represented by these equations:

$$3Ca(OCl)_2 \rightarrow Ca(ClO_3)_2 + 2CaCl_2 \qquad (XI)$$

$$Ca(OCl)_2 \rightarrow CaCl_2 + O_2 \qquad (XII)$$

$$Ca(OCl)_2 + 2H_2O \rightarrow Ca(OH)_2 + 2HOCl \qquad (XIII)$$

The reactions shown by XI and XII represent the decomposition caused by simple temperature rise or the presence of some foreign substance which could initiate decomposition. Hydrolytic decomposition can occur as represented by Equation XIII. All of these decomposition actions may be triggered or initiated or further carried along by the heat given off by the $Mg(OCl)_2$.

While the exact reasons for the different reaction rates of $Ca(OH)_2$, $Mg(OH)_2$ and $MgO$ in high magnesium-containing hydrated limes are not known, it is theorized that the reaction rates differ because substantial differences in solubility among these three compounds in water (note Table I below); and because the chlorinating agent is water-soluble in nature, it is believed that it will react the more soluble constituents first before reacting with the solid or insoluble constituents. For these reasons, it is thought the $Ca(OH)_2$ reacts much faster than the $Mg(OH)_2$ and $MgO$.

TABLE I

| Compound | Solubility in Water (grams/100 cc) |
|---|---|
| $Mg(OH)_2$ | 0.0009 (at 18° C) |
| $MgO$ | 0.00062 (at 18° C) |
| $Ca(OH)_2$ | 0.185 (at 30° C); 0.077 (at 100° C) |

As stated above, methods of monitoring the chlorination step include pH control or chemical analysis. However, it must be remembered that a change in pH of these impure hydrated lime slurries cannot be made to correspond to a change in pH of relatively pure $Ca(OH)_2$ lime slurries since there will always be some amount of Mg in the present reaction mixture which will always affect the pH.

Besides the above termination limitation, other conditions of these chlorination reactions can be conventionally employed. Low temperatures in the range of 0° – 20° C normally used in the triple salt process and temperature may be employed. Any pressures can be employed. Atmospheric pressure is preferred because it negates the need for pressurize-control equipment. The amount of water employed in the chlorination step also is not not critical and aqueous slurries which are commercially advantageous can be employed. Furthermore, the chlorination step can be carried out on a batch or continuous basis using conventional apparatus.

After the chlorination step, the aqueous chlorinated slurry is processed according to conventional steps well known in the $Ca(OCl)_2$ industry. The substantially water-insoluble and substantially unchlorinated magnesium compounds remain with the calcium hypochlorite so that final composition will contain these magnesium compounds. In particular, this further processing of the magnesium compounds is a difference over the process described in U.S. Pat. No. 3,895,099, wherein the magnesium impurities are immediately removed after a preliminary chlorination step.

Alternatively, if the triple salt is produced, the further processing conventionally comprises isolating the triple salt, reacting it with a chlorinated lime slurry and finally removing the water to a lower desirable level. In the present invention, the substantially insoluble and unchlorinated magnesium compounds are removed with the triple salt from the mother liquor of the chlorinated aqueous slurry, and this combination is reacted with chlorinated lime slurry to decompose the triple salt and convert the NaOCl contained therein to $Ca(OCl)_2$. The magnesium compounds remain for the most part unaffected by the reaction between the triple salt and the chlorinated lime slurry. Subsequently, this resulting slurry is dried by many various means to remove the water of the slurry. One method of drying is to centrifuge the slurry to separate out a second mother liquor containing dissolved salts. In many cases, both mother liquors are recycled in various prior steps of the process. The resulting solids are in the form of a wet cake which normally contains about 40–50% by weight water. The wet cake is then dried by known means, for example, using a spray dryer, turbodryer or vacuum dryer where the appropriate temperature ranges are employed to reduce the water content to the desired range of from about 0.1% to about 15% by weight of the composition.

The dry material, now in the final composition form is passed over screens, which separates the desired granular fraction from oversize and granular fines fractions. The fines which cannot be sold as a commercial product are recovered by being compacted in a roller apparatus, recrushed and then passed through the screening system again. The oversize fraction from the screening system which cannot be sold as a commercial product is sent to crushing apparatus and then reclassified in the screening system. The granular composition product is then packaged in drums or bags or directly made into tablets.

The present invention also encompasses a resulting calcium hypochlorite composition comprising calcium hypochlorite and about 0.5% to about 50% by weight substantially water-insoluble and unchlorinated magnesium compounds derived from hydrated limes. The composition may have varying percentages of the conventional constituents of calcium hypochlorite compositions, such as sodium chloride, calcium chlorite, calcium hydroxide, calcium carbonate and calcium chloride. However, the presence or exact amount of such constituents is not critical to the present invention. In fact, the magnesium compounds of the present invention may replace some or all amounts of any of these compounds.

If the calcium hypochlorite composition of the present invention is to be employed as a pool chemical, the amount of $Ca(OCl)_2$ in the composition should be at least about 60% by weight of the composition and the amount of substantially water-insoluble and unchlorinated magnesium compounds are preferably from about 0.5% to about 10% by weight of the composition. If the calcium hypochlorite composition is to be employed as a cleanser, such as a scouring powder, the amount of $Ca(OCl)_2$ in the composition may be much lower, i.e., less than about 30% by weight of the composition. Correspondingly, the amount of the magnesium compounds in the composition may be raised. Cleansers may easily contain magnesium compounds in amounts from about 10% to about 50% by weight. Dolomitic limes (hydrated limes containing relatively very high amounts of Mg) would be quite advantageous source material for making calcium hypochlorite compositions for this latter use.

The above composition of the present invention may be mixed with other additives for beneficial results. For instance, additives known to react with calcium chloride such as trisodium phosphate, sodium oxalate, sodium carbonate, sodium hydroxide, potassium phosphate and sodium sulphate can be added to the present composition. These compounds are substantially completely water-soluble and react with calcium chloride to form water-soluble sodium chloride. Furthermore, the present composition may also be admixed with the water-soluble hydrated salts described in U.S. Pat. No. 3,793,216, issued to Dychdala et al, which reduces the reactivity of $Ca(OCl)_2$ and provides good resistance to self-propagating decomposition reactions described above.

The water content of the composition of the present invention is not critical. Normally, it will be in the range from about 0.1% to about 15% by weight of the composition. However, it should be understood that any amount of water can be present which provides a commercially acceptable product.

The following examples further illustrate the present invention. All parts and percentages employed therein are by weight unless otherwise indicated.

EXAMPLE 1

A sample of commercial hydrated lime (I), a detailed analysis of which is shown in Table II, was used to prepare calcium hypochlorite composition via a triple salt process as follows:

a. Preparation of triple salt crystals

A 1000 ml, four-neck round bottom flask was equipped with a stirrer, thermometer, gas inlet tube and pH probe. The flask was charged with 287.5 g $H_2O$, 81.6 g of the commercial hydrated lime (I) and 165.1 g of 50.15% aqueous NaOH. The temperature was adjusted to 28° C with a water bath and chlorine gas was bubbled into the slurry at a rate of about 1.5 g/min. Temperature was kept 28°–31° C by means of an ice bath during chlorination. Chlorination was continued for about one hour at that temperature. Chlorination was then interrupted and the reaction mixture was cooled to 2° C with a dry ice/acetone bath. Chlorination was resumed and continued until the pH of the reaction mixture was 10.0, (this took about 15 minutes) while maintaining temperature at about 2°–5° C. Bubbling in chlorine gas was then terminated. The reaction mixture was then cooled to −14° C over a period of about 15 minutes and held at that temperature for about 60 minutes to promote crystal growth. At the end of the crystal growth period, the triple salt crystals were filtered on a coarse porosity, fritted filter funnel, analyzed and used as described in the paste make-up section below. The triple salt crystals were found to contain 27.35% $Ca(OCl)_2$, 9.05% NaOCl, 13.30% NaCl and 0.71% total alkalinity expressed as $Ca(OH)_2$[1]. It was also determined that the $Ca(OH)_2$ conversion was 97.9%, corrected for $CaCO_3$, based on 325 g of triple salt crystals recovered.

[1]Total alkalinity is a measurement of all the alkali species left in the reaction mixture that will react with HCl. These include $Mg(OH)_2$, MgO, $CaCO_3$ and $Ca(OH)_2$ principally. The method of analysis used here is not able to distinguish between alkalinity due to calcium and alkalinity due to magnesium, so the alkalinity was expressed as $Ca(OH)_2$ in accordance with standard practice. The total alkalinity was not corrected for $CaCO_3$.

b. Preparation of chlorinated lime slurry

A 500 ml, four-neck round bottom flask was equipped with a stirrer, thermometer, gas inlet tube and pH probe. The flask was charged with 300.0 g $H_2O$ and 111.0 g, the same commercially hydrated lime (I). The temperature was adjusted to 28° C and chlorine gas was bubbled into the slurry at about 1.5 g/min. Temperature was maintained at 28°–30° C during the total chlorination. When the pH of the reaction mixture reached 10.0, chlorination was stopped. The slurry was then analyzed and used as described in the paste make-up section below. The chlorinated lime was found to contain 19.17% $Ca(OCl)_2$, 14.74% $CaCl_2$ and 1.27% total alkalinity expressed as $Ca(OH)_2$[1] (see footnote[1]). It was also determined that the $Ca(OH)_2$ conversion was 96.4%, corrected for $CaCO_3$, based on 509.0 g of finished slurry.

c. Paste make-up

Based on the $CaCl_2$ content of the chlorinated lime slurry and the NaOCl content of the triple salt crystals, the two intermediates were combined such that the ratio of NaOCl to $CaCl_2$ was 1.375:1 (w/w). Thus, 268.2 g chlorinated lime slurry was placed in a 1000 ml beaker equipped with a stirrer and heated to 28° C. Then 317.7 g triple salt crystals were added over a period of about five minutes, keeping temperature 28°–30° C. After an additional 5 minutes stirring at 28°–30° C, the calcium hypochlorite composition product was then ready for isolation.

d. Product isolation and workup

The calcium hypochlorite paste prepared above was filtered on a coarse porosity fritted glass filter funnel, using a water aspirator vacuum to obtain as dry a cake as possible. The wet cake was then dried for 16 hours in a room temperature vacuum oven, followed by 4 hours in a 45° C vacuum oven.

e. Analytical results

The product prepared as described above was found to contain 71.00% $Ca(OCl)_2$, 15.25% NaCl, 3.72% $H_2O$, 2.00% $CaCl_2$ and 5.35% total alkalinity as Ca(OH)$_2$[1] (see footnote[1]). The filtrates from preparation of triple salt crystals and final product isolation were combined and analyzed for magnesium. This analysis accounted for only 0.25% of the magnesium in the starting lime (found 7 ppm Mg in 550.6 g filtrate), indicating that only about 0.3% of the magnesium, including a correction factor for mother liquor retained by the wet cake, had reacted during chlorination in steps a and b combined.

TABLE II

| Component | Lime Analysis Content, % By Weight |
|---|---|
| Ca(OH)$_2$ | 93.30 |
| CaO | 0.15 |
| CaCO$_3$ | 2.20 |
| Mg | 0.81 |
| SiO$_2$ | 0.66 |
| CaSO$_4$ | <0.02 |
| Mn | <0.005 |
| Fe$_2$O$_3$ | 0.11 |
| Al$_2$O$_3$ | 0.24 |
| Other impurities | Balance |

EXAMPLE 2

A second sample of commercial hydrated lime (II), a detailed analysis of which is shown in Table III, was used to prepare calcium hypochlorite via the triple salt process described in Example 1.

a. Preparation of triple salt crystals 287.5g H$_2$O, 80.1 g the commercial hydrated lime (II) and 164.4 g 50.15% aqueous NaOH were chlorinated to pH 10.0 as described above. The triple salt crystals thus formed were found to contain 26.13% Ca(OCl)$_2$, 6.50% NaOCl, 14.13% NaCl and 0.71% total alkalinity expressed as Ca(OH)$_2$. It was also found that the Ca(OH)$_2$ conversion was 97.2%, corrected for CaCO$_3$, based on 365.0g of triple salt crystals obtained.

b. Preparation of chlorinated lime slurry 300.0 g H$_2$O and 109.2 g lime were chlorinated to pH 9.9 as described above. The chlorinated lime slurry thus formed was found to contain 19.05% Ca(OCl)$_2$, 14.04% CaCl$_2$ and 0.83% total alkalinity expressed as Ca(OH)$_2$. It was also determined that the Ca(OH)$_2$ conversion was 97.9%, corrected for CaCO$_3$, based on 506.9 g chlorinated lime slurry obtained.

c and d. Paste preparation/product workup 227.1 g chlorinated lime slurry and 356.8 g triple salt crystals were combined according to the procedure as described in Example 1 and the calcium hypochlorite composition product was filtered and dried.

e. Analytical Results

The dried product was found to contain 72.06% Ca(OCl)$_2$, 15.17% NaCl, 2.15% CaCl$_2$, 1.19% H$_2$O and 5.39% total alkalinity expressed as Ca(OH)$_2$. Analysis of the combined process filtrates accounted for only 0.09% of the magnesium in the starting lime (found 2 ppm Mg in 565.2 g filtrate), indicating that slightly greater than 0.1% of the magnesium had reacted during chlorination in steps a and b combined.

TABLE III

| Component | Lime Analysis Content, % By Weight |
|---|---|
| Ca(OH)$_2$ | 94.60 |

TABLE III-continued

| Component | Lime Analysis Content, % By Weight |
|---|---|
| CaCO$_3$ | 1.92 |
| H$_2$O | 0.35 |
| Mg | 0.69 |
| SiO$_2$ | 0.26 |
| CaSO$_4$ | 0.04 |
| Mn | 0.008 |
| Fe$_2$O$_3$ | 0.09 |
| Al$_2$O$_3$ | 0.11 |
| Other Impurities | Balance |

EXAMPLE 3

A third sample of commercial hydrated lime (III), a detailed analysis of which is shown in Table IV, was used to prepare calcium hypochlorite via the triple salt process as described in Example 1. Since this lime is dolomitic, there was no possibility of producing a high test of Ca(OCl)$_2$ composition. This example is included to demonstrate the efficacy of the modified process in handling limes containing very high levels of magnesium impurities.

a. Preparation of triple salt crystals 287.5 g H$_2$O, 80.0 g hydrated lime (III) and 115.0 g 50.15% aqueous NaOH were chlorinated to pH 10.0 as described in Example 1. The triple salt crystals thus formed were found to contain 27.36% Ca(OCl)$_2$, 11.09% NaOCl, 12.77% NaCl and 7.83% total alkalinity expressed as Ca(OH)$_2$. From previous examples, it is known that substantially all of this total alkalinity is present as MgO and/or Mg(OH)$_2$.

b. Preparation of chlorinated lime slurry 300.0 g H$_2$O and 110.0 g hydrated lime III, were chlorinated to pH 10.0 as described in Example 1. The chlorinated lime slurry thus formed was found to contain 12.66% Ca(OCl)$_2$, 10.74% CaCl$_2$ and 13.87% total alkalinity expressed as Ca(OH)$_2$.

c and d. Paste preparation/product workup 235.0 g chlorinated lime slurry and 165.5 g triple salt crystals were combined according to the procedure as described in Example 1 and the calcium hypochlorite composition product was filtered and dried.

e. Analytical results

The dried product was found to contain 42.26% Ca(OCl)$_2$. While this product does not have the utility of the high test (i.e., above 70%) Ca(OCl)$_2$ material, its preparation demonstrates the feasibility of using lime with very high levels of magnesium impurities in a triple salt process. Such products can be used for household cleansers such as scouring powders.

TABLE IV

| Component | Lime Analysis Content, % By Weight |
|---|---|
| Ca(OH)$_2$ | 64.00 |
| CaO | 2.00 |
| CaCO$_3$ | 3.20 |
| Mg | 15.26 |
| SiO$_2$ | 0.38 |
| CaSO$_4$ | 0.06 |
| Mn | 0.007 |
| Fe$_2$O$_3$ | 0.07 |
| Al$_2$O$_3$ | 0.06 |
| Other Impurities | Balance |

COMPARISON 1

The hydrated lime of Example 1 was used to prepare calcium hypochlorite via an alternative triple salt process as follows:

a. Preparation of triple salt crystals

Apparatus, reagents and procedure were the same as those of Example 1 except that the reactor was not equipped with a pH electrode and chlorination was continued so that substantially 100.0% of the $Ca(OH)_2$ in the hydrated lime was chlorinated. The triple salt crystals thus formed were found to contain 27.64% $Ca(OH)_2$, 6.44% NaOCl, 13.66% NaCl and 0.15% total alkalinity expressed as $Ca(OH)_2$. Analysis showed as $Ca(OH)_2$ conversion of essentially 100%, corrected for $CaCO_3$, based on 330.0 g triple salt crystals obtained.

b. Preparation of chlorinated lime slurry

Apparatus, reagents and procedure were the same as those of Example 1 except the reactor was not equipped with a pH electrode and chlorination was continued until substantially 100% $Ca(OH)_2$ was converted. The chlorinated lime slurry thus formed was found to contain 19.08% $Ca(OCl)_2$, 14.43% $CaCl_2$ and 0.34% total alkalinity expressed as $Ca(OH)_2$. Analysis also showed a $Ca(OH)_2$ conversion of essentially 100%, corrected for $CaCO_3$, based on 509.0 g of finished slurry.

c and d. Paste preparation/product workup 322.9 g triple salt crystals and 198.1 g chlorinated lime slurry were combined as described in Example 1 and the product was filtered and dried.

e. Analytical results

The dried product was found to contain 67.42% $Ca(OCl)_2$, 17.74% NaCl, 2.00% $CaCl_2$, 3.60% $H_2O$ and 2.76% total alkalinity expressed as $Ca(OH)_2$. It had a significantly lower $Ca(OCl)_2$ content than Example 1. Furthermore, this product did not meet the industrial specification of 70% $Ca(OCl)_2$. Analysis of the combined process filtrates accounted for 7.1% of the magnesium in the starting lime (found 221 ppm Mg in 501.0 g filtrate) indicating that about 9% of the magnesium in the starting lime, including a correction factor for mother liquor retained by the wet cake, reacted during chlorination steps a and b combined.

COMPARISON 2

The hydrated lime of Example 2 was used to prepare calcium hypochlorite via the alternative triple salt process as described in Comparison 1.

a. Preparation of triple salt crystals

Apparatus and procedure were the same as described in Comparison 1. The triple salt crystals thus formed were found to contain 26.84% $Ca(OCl)_2$, 6.72% NaOCl, 14.08% NaCl and 0.64% total alkalinity expressed as $Ca(OH)_2$. This represents a $Ca(OH)_2$ conversion of 97.8% corrected for $CaCO_3$, based on 342.0 g triple salt crystals obtained.

b. Preparation of chlorinated lime slurry

Apparatus and procedure were the same as described in Comparison 1. Reagents were the same as described in Example 2. The chlorinated lime slurry was found to contain 18.88% $Ca(OCl)_2$, 15.89% $CaCl_2$ and 0.33% total alkalinity expressed as $Ca(OH)_2$. This represents a $Ca(OH)_2$ conversion of 99.9%, corrected for $CaCO_3$, based on 507.0 g of finished slurry.

c and d. Paste preparation/product workup 333.7 g triple salt crystals and 193.5 g chlorinated lime slurry were combined as described in Example 1 and the product was filtered and dried.

e. Analytical Results

The dried product was found to contain 67.59% $Ca(OCl)_2$, 12.37% NaCl, 5.42% $CaCl_2$, 4.16% $H_2O$ and 5.15% total alkalinity expressed as $Ca(OH)_2$. It, therefore, had a significantly lower $Ca(OCl)_2$ content than the composition of Example 2. Analysis of the combined process filtrates accounted for 6.9% of the magnesium in the starting lime (found 144 ppm Mg in 557.0 g filtrate), indicating that about 8.5% of the magnesium, including a correction factor for mother liquor retained by the wet cake, reacted during chlorination steps a and b.

COMPARISON 3

Preparation of calcium hypochlorite composition via the conventional triple salt process of Comparison 1 was attempted using the hydrated lime (III) of Example 3. Chlorination, both in the preparation of triple salt crystals and in the preparation of chlorinated lime slurry, resulted in the vigorous decomposition of both reactant slurries. No product was obtained.

What is claimed is:

1. In a process for the manufacture of a solid calcium hypochlorite composition wherein an aqueous slurry comprising hydrated lime is chlorinated to form an aqueous chlorinated slurry containing calcium hypochlorite and further processing said chlorinated slurry to recover a solid calcium hypochlorite composition, the improvement which comprises:
   (a) employing a hydrated lime having about 97% to about 50% by weight calcium hydroxide and more than about 0.5% by weight magnesium based on the total dry weight of said hydrated lime,
   (b) terminating said chlorination reaction when from about 75% to about 99.5% by weight of said calcium hydroxide is chlorinated and from 0% to about 5% by weight of said magnesium is chlorinated to form an aqueous chlorinated slurry containing substantially water-insoluble and unchlorinated magnesium compounds and calcium hypochlorite, and
   (c) further processing said chlorinated slurry to remove a solid calcium hypochlorite composition having admixed therein said substantially water-insoluble and unchlorinated magnesium compounds.

2. The process of claim 1 wherein said aqueous slurry is selected from the group consisting essentially of hydrated lime, a mixture hydrated lime and at least one alkali metal hydroxide and a mixture of hydrated lime and at least one alkali metal hypochlorite.

3. The process of claim 2 wherein said aqueous slurry is a mixture of said hydrated lime as defined in (a) and sodium hydroxide.

4. The process of claim 2 wherein said aqueous slurry is a mixture of said hydrated lime as defined in (a) and sodium hypochlorite.

5. The process of claim 4 wherein said chlorination reaction is carried out at a temperature below 30° C and the triple salt - $Ca(OCl)_2 \cdot NaOCl \cdot NaCl \cdot 12H_2O$ - is formed.

6. The process of claim 1 wherein said chlorination reaction is terminated when at least about 90% by weight of said calcium hydroxide is chlorinated and from less than about 2.5% by weight of said magnesium is chlorinated.

7. The process of claim 1 wherein said chlorinated slurry is further processed which comprises drying said chlorinated slurry to reduce the water content to the range of from about 0.1% to about 15% by weight of the composition.

8. A solid calcium hypochlorite composition comprising calcium hypochlorite and about 0.5 to about 50% by weight substantially water-insoluble and unchlorinated magnesium compounds derived from hydrated limes.

9. A composition of claim 8 wherein the amount of said calcium hypochlorite is at least about 60% by weight of the composition and the amount of said magnesium compounds is from 0.5% to about 10% by weight of the composition.

10. A composition of claim 8 wherein the amount of said calcium hypochlorite is less than about 30% by weight of the composition and the amount of said magnesium compounds is from about 10% to about 50% by weight of the composition.

* * * * *